(12) United States Patent
Elze et al.

(10) Patent No.: US 7,410,145 B1
(45) Date of Patent: Aug. 12, 2008

(54) VALVE FOR SPEED FILLING A DUNNAGE BAG

(76) Inventors: Olaf Elze, 284 La Quinta Ct., Walnut Creek, CA (US) 94598; Helmut Elze, 827 Grosvenor Pl., Oakland, CA (US) 94610; Mark Caires, 5328 Villa's Ct., Winston Salem, NC (US) 27103

( * ) Notice: Subject to any disclaimer, the term of this patent is extended or adjusted under 35 U.S.C. 154(b) by 0 days.

(21) Appl. No.: 11/189,619

(22) Filed: Jul. 26, 2005

Related U.S. Application Data (63) Continuation-in-part of application No. 11/124,321, filed on May 4, 2005.

(51) Int. Cl.
*F16K 35/00* (2006.01)
(52) U.S. Cl. .......... 251/100; 251/83; 251/323; 141/350
(58) Field of Classification Search .......... 251/100, 251/323, 351, 353, 354, 82, 83; 141/10, 141/68, 114, 349, 350
See application file for complete search history.

(56) References Cited

U.S. PATENT DOCUMENTS

| | | | | | |
|---|---|---|---|---|---|
| 3,753,442 | A | * | 8/1973 | Tauber | 137/15.17 |
| 4,237,519 | A | * | 12/1980 | Wilson | 361/327 |
| 4,258,904 | A | * | 3/1981 | Scremin et al. | 251/339 |
| 4,766,628 | A | * | 8/1988 | Walker | 5/706 |
| 5,082,244 | A | * | 1/1992 | Krier et al. | 251/149.6 |
| 6,009,895 | A | * | 1/2000 | Wass et al. | 137/223 |
| 6,089,251 | A | * | 7/2000 | Pestel | 137/234.5 |

* cited by examiner

*Primary Examiner*—Eric Keasel
*Assistant Examiner*—John K. Fristoe, Jr.
(74) *Attorney, Agent, or Firm*—Robert Samuel Smith (57) ABSTRACT

A valve to be mounted on a dunnage bag having one collar mounted on the bag, a seal plate positionable adjacent to an interior end of the collar and a stem slideably mounted in the collar to position the seal plate in one position where air is prevented from passing through the collar and in another position where the seal plate may be locked permitting air to escape from the bag.

8 Claims, 8 Drawing Sheets

VALVE FOR SPEED FILLING A DUNNAGE BAG

CROSS REFERENCE TO RELATED APPLICATIONS

This application is a continuation-in-part of application Ser. No. 11/124,321 filed May 4, 2005 from which priority is claimed

FIELD OF THE INVENTION

This invention relates to methods for speed pumping gas into a chamber and particularly for speed filling containers for gas such as dunnage bags used for cushioning freight in transit.

BACKGROUND AND INFORMATION DISCLOSURE

Numerous items are available on the market that require inflation with a gas to moderate pressures (often air) The situation often require that many of these items must be filled so that the overall time required to fill them requires a substantial period of time.

Examples of such items include balloons, balls, and cushions, for stadium seats. The numbers of items to be filled can be hundreds or even thousands. The time required to fill these items becomes an important cost factor.

An important application of an air filled cushion in industry is the dunnage bags such as are used to cushion freight during transit.

These bags are typically about four to eight feet on a side and are ten to twenty inches thick. They are positioned between stacks of cargo, typically on pallets and carried on trucks, planes, or ships.

The demand for "streamlining" the dunnage bag industry has resulted in significant economizing and reliability not only in the construction of the bag but also in the tools and method for filling and emptying the bag.

A typical "dunnage bag", is an inflatable bag made of paper and/or other synthetic material with an airtight liner. The bag is placed on a conveying vehicle between stacks of cargo to prevent the shifting of cargo during transportation. Each bag is placed in the space between the cargo and the walls of the container or between neighboring rows of pallets holding cargo and then inflated. The bags are typically inflated to a pressure of not more than 1½ to 2 pounds per square inch (psi). In some operations, the time required to empty the bags is so expensive that, when the cargo arrives at its destination and prior to unloading, the bags are simply punctured and discarded. Destroying the bag avoids spending the time to empty air out of the bag after the destination is reached.

The remaining problem is to reduce the time required to inflate the bag in preparation for its journey.

In response to the demand for an improved dunnage bag system including shortening the operation time, a number of concepts have been disclosed.

U.S. Pat. No. 5,042,663 to Heinrick discloses joinable inflatable bladders for packaging.

U.S. Pat. No. 5,431,525 to Sansone et al discloses a dual air bladder air bag.

Other approaches to economizing the dunnage bag system have included improved valves.

For example, U.S. Pat. No. 4,073,389 to Angarola et al discloses a housing engaging a spring loaded plug that permits one way entry of air into the bag. However, the valve tends to dysfunction and leak with aging of the spring.

U.S. Pat. No. 4,102,364 to Leslie et al discloses a system for rapid pressurizing the air inside the bag from a source of high pressure air.

U.S. Pat. Nos. 4,146,069 and 4,146,070 to Angarola et al discloses another system for rapid filling using a stream of pressurized air to aspirate ambient air into the bag.

U.S. Pat. No. 5,111,838 to Langston discloses a spring loaded valve member movable to open a passage and threaded opening to engage an air hose.

U.S. Pat. No. 5,806,572 discloses an apparatus for inflating a bag to a desired limit.

U.S. Pat. No. 6,053,222 discloses a gun that both inflates the bag when required and accelerates deflation of the bag when required.

None of the several versions of a valve for a dunnage bag described in the cited art address the problem of how to reduce the time required to inflate the bag. Typical inflation systems are characterized by a constant high pressure so that air initially flows into the bag at a fast rate but flow slows down as the target pressure is reached.

SUMMARY OF THE INVENTION

It is an object of this invention to provide a valve to be mounted on a container such as a dunnage bag that permits convenient presssurizng the valve from the nozzle of an air hose and releasing the air by pressing on release disk that is part of the valve.

It is another object that the release disk be retained in the "open" position when it is required to empty air out of the bag without requiring continued attention from the operator.

This invention is directed toward a collar mounted on the edge of an opening in the dunnage bag. A stem is slideably positioned in a slide hole in a shoulder on the end of the collar. The stem has an end that extends out of the collar into the interior of the bag. A seal plate is mounted on the end of the stem inside the bag.

A release disk accessible to a user is mounted on the other end of the stem and slides with the stem inside the collar.

The release disk is accessible to a user who depresses the release disk into the collar in order to release air from the bag.

A spring between the release disk and a shoulder on the interior end of the collar (inside the bag) biases the seal plate against the interior end of the collar thereby preventing air from escaping from inside the bag. When a user depresses the release disk, the seal plate is moved out of contact with the shoulder (the exhaust position) and permits air to escape from inside the bag.

The stem has a cicumferential groove on one end of a longitudinal groove. The user rotates the release disk to where a spur on the edge of the guide hole engages the longitudinal slot permitting the seal plate on the end of the stem to move towards or away from the shoulder.

When the release plate is rotated so that the spur engages the circumferential slot in the stem, then the seal plate is retained in a position separated from the shoulder. This allows the user to open the valve, allowing air to escape while the user goes to other chores while the air is emptied from the bag.

DISCUSSION OF A BEST MODE

Figure 1:
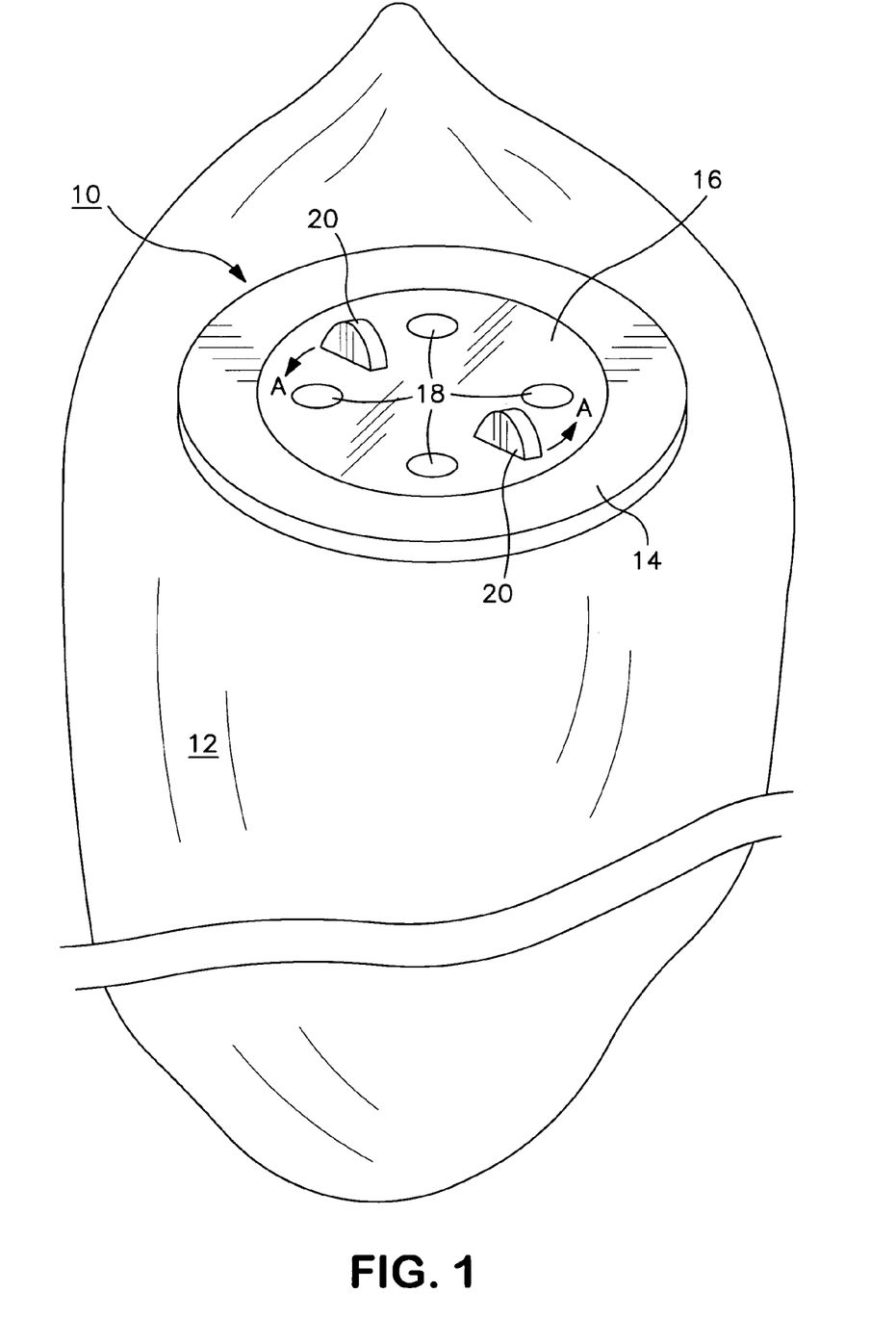
FIG. 1 shows a valve of this invention mounted on an inflated dunnage bag.

Turning now to a discussion of the drawings, FIG. 1 shows the valve 10 of this invention mounted on the edge of a dunnage bag 12. The bag is cutaway. There are shown parts of the valve 10 including the outer flange 14 and the release disk 16 which the operator presses to allow air to escape from the pressurized bag 12 or force air into the bag by forcing the open end of a nozzle of an air hose against the release disk.

The release disk 16 has four bleed openings 18 through which air escapes when the release disk 16 is depressed. Two knobs 20 are shown to enable the operator to rotate the release disk 16 when he requires that the valve be left open unattended to release air. This feature is especially useful when a large number of bags must be "depressurized" so that the operator need only to rotate the release disk 16 a few degrees (see arrow A) and then attend to other bags.

Figure 7:
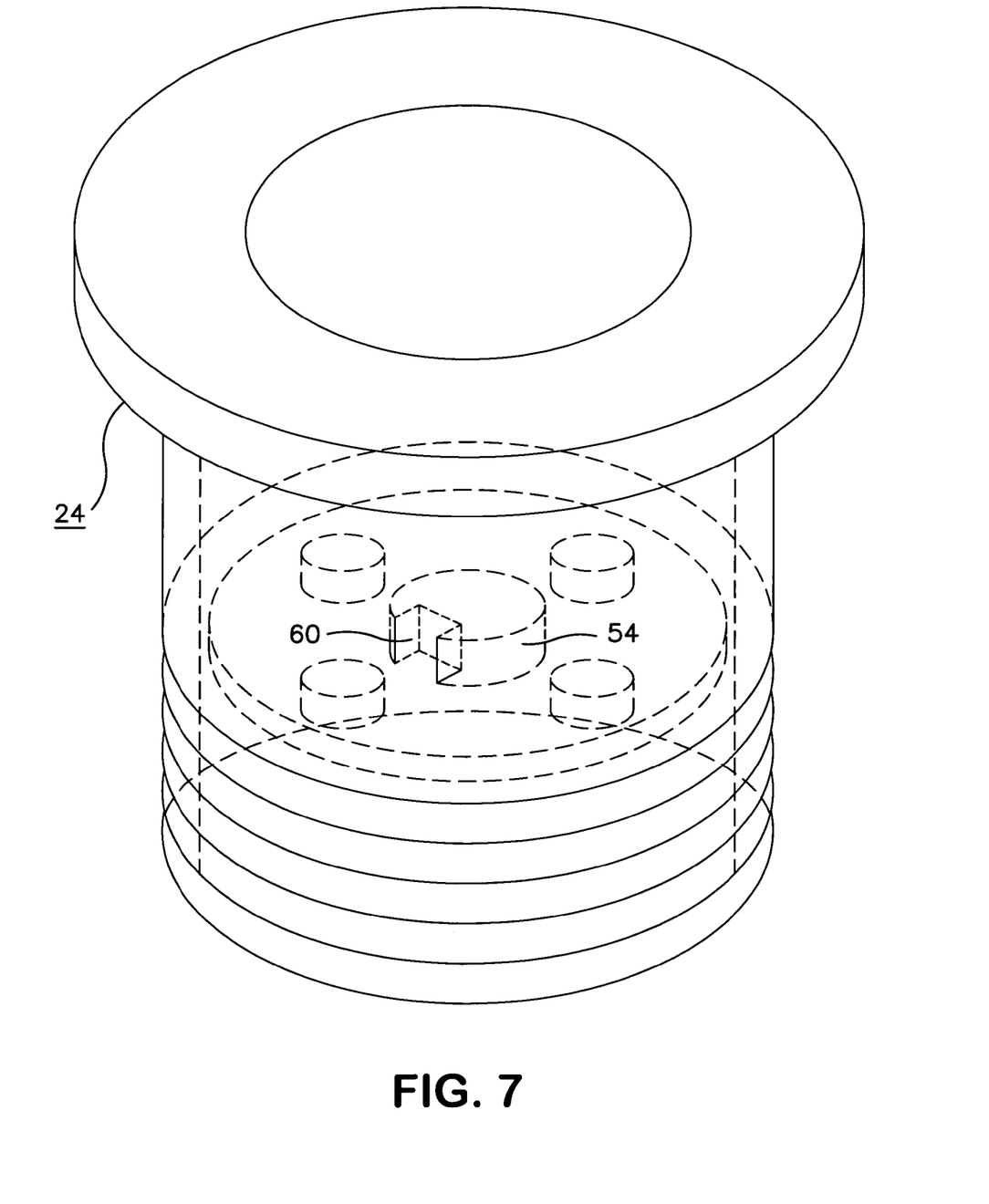
FIG. 7 shows the outside flange
Figure 8:
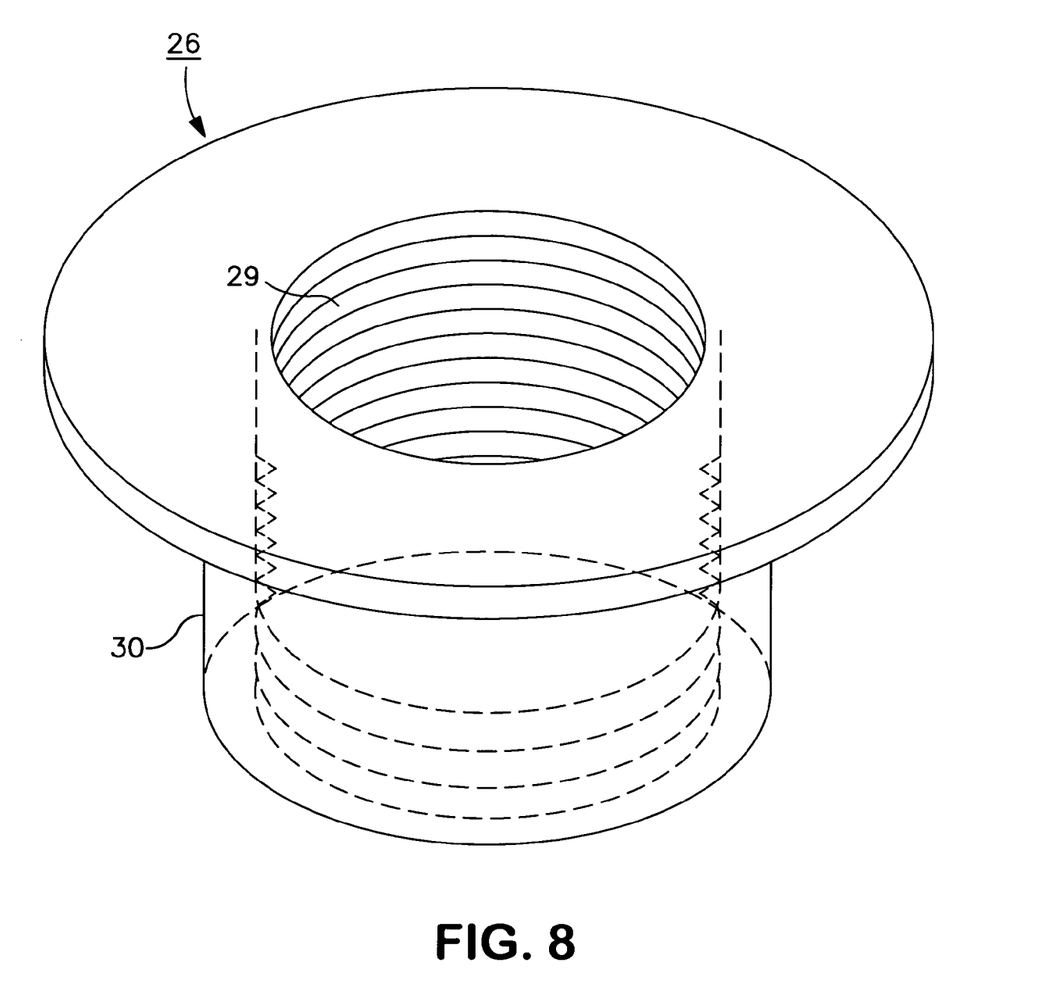
FIG. 8 shows the inside flange.

The three separate parts of the valve are the sliding gate 22, (FIG. 6), the outer flange mount 24, (FIG. 7), the inner flange mount 26 (FIG. 8)

Figure 2:
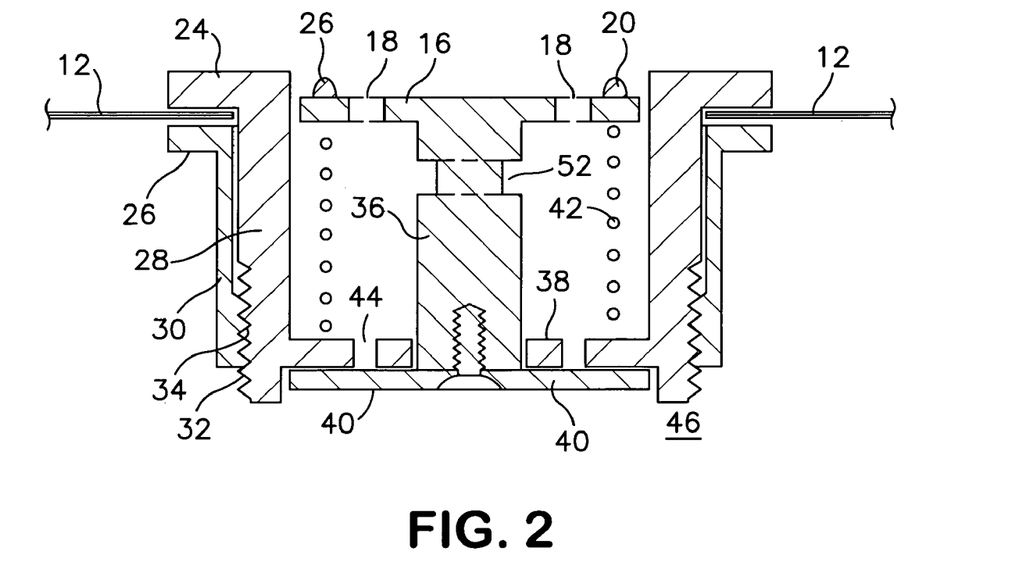
FIG. 2 is a sectional view of the valve when the bag is pressurized.

FIG. 2 is a sectional assembly view of the valve in the "closed" condition to retain air in the bag.

Figure 3:
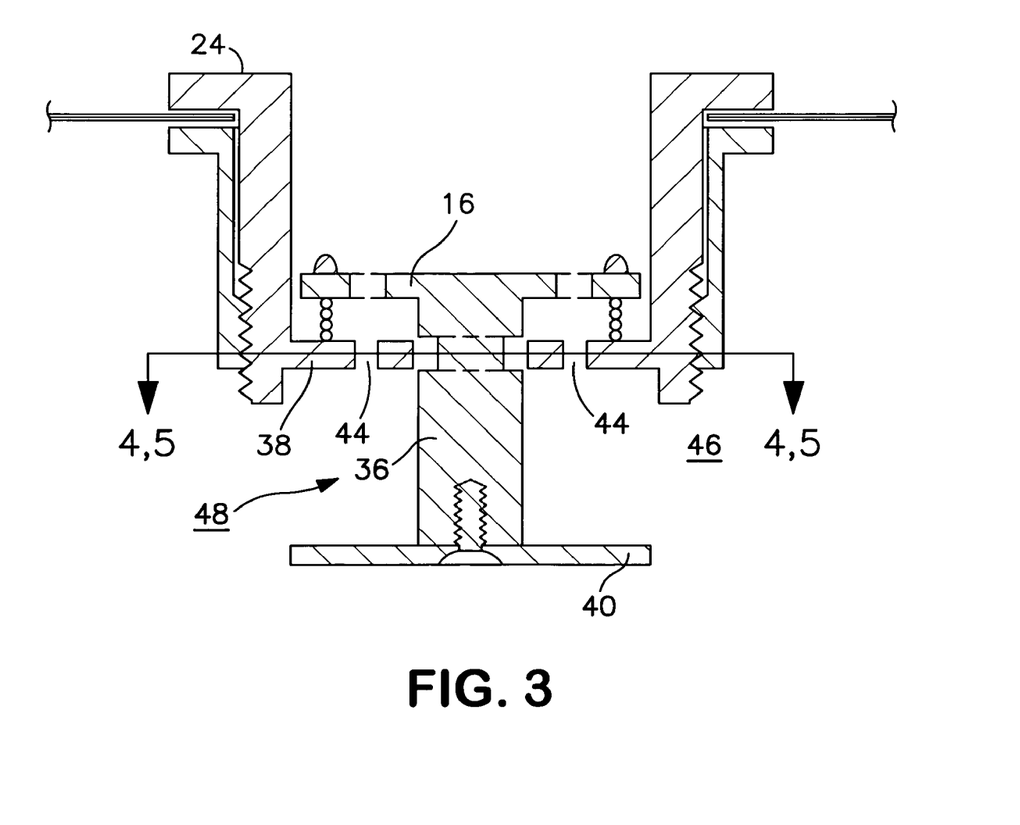
FIG. 3 shows a sectional view of the valve in condition for releasing pressurized gas.

FIG. 3 is a sectional assembly view of the valve in the "open" condition to exhaust pressurized air from the bag.

Clamping 12 secure the valve 10 the edge of an opening in the bag between outer flange 24 and inner flange 26.

Outer flange 24 is mounted on one end of outer flange collar 28.

Inner flange 26 is mounted on one end of inner flange collar 30. FIG. 8 shows details of the outer flange assembly including inner flange 26 mounted on inner flange collar 30. The internal thread 29 of inner flange collar 30 is shown A thread 32 on the lower end of inner flange collar 30 is tightly screwed into thread 34 in order to tighten the grip of the valve 10 on the edge of an opening in the bag. The strong grip of the valve on the bag provides an air tight seal in the bag 12.

A shoulder 38 is integrally formed with the interior of outer flange collar 28.

The release disk 16 is mounted on one end one end of piston 36. Piston 36 slides in an opening of shoulder 38.

A seal plate 40 is bolted onto an end of stem 36 opposite release disk 16.

A coil spring 42 biases seal plate 40 against shoulder 38 and closes off air-escape apertures 44 in seal plate 40. Pressurized air is thereby prevented from escaping from the interior 46 of the bag until the release disk 16 is pressed thereby uncovering the air escape holes.

Figure 6:
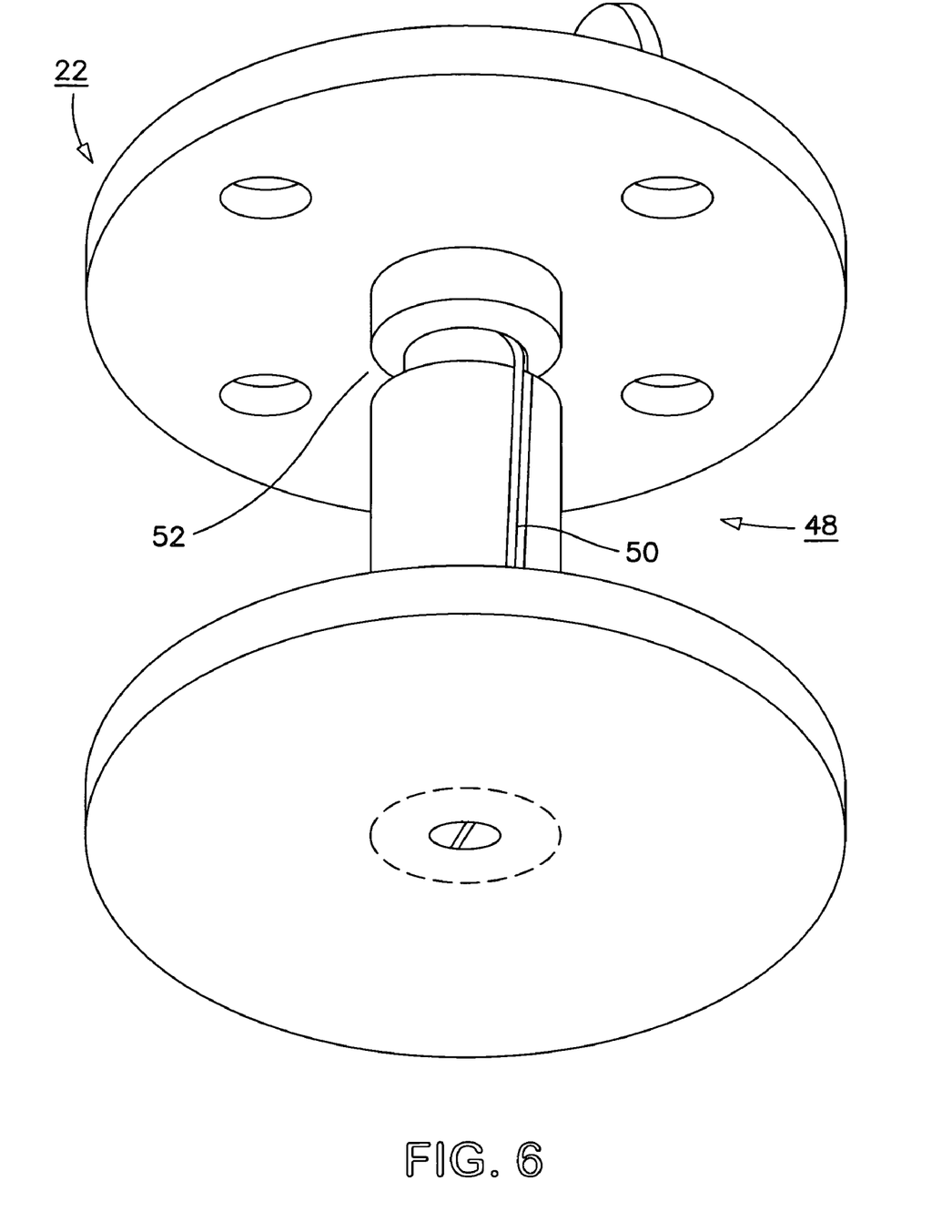
FIG. 6 shows the sliding member of the valve.

FIG. 6 shows details of the piston assembly 48. (features 16, 36, 40 in FIG. 6). The surface of stem 36 has a longitudinal groove 50 connected to a circumferential groove 52.

FIG. 7 shows details of the outer-flange-collar-shoulder assembly (respectively, 24, 28, 38.) Stem 36 slides in opening 54 in shoulder 38. Opening 54 has a spur 60 which engages the longitudinal groove 50 so that assembly 48 slides in an axial direction when release disk 16 is pressed.

This action forces seal plate 40 away from shoulder 44 and uncovers apertures 44 allowing air to escape from inside the bag 12.

In order to retain the seal plate 40 in the "air-escape" position, the operator rotates the release disk by twisting the studs 20 mounted on seal plate 40 so that spur 60 is now positioned in circumferential groove 52. When the spur 60 is in the longitudinal groove 52, seal plate 40 remains separated from shoulder 44 allowing air to escape from inside the bag 12 through apertures 44 in shoulder 38 and openings 18 in release disk 16.

Figure 4:
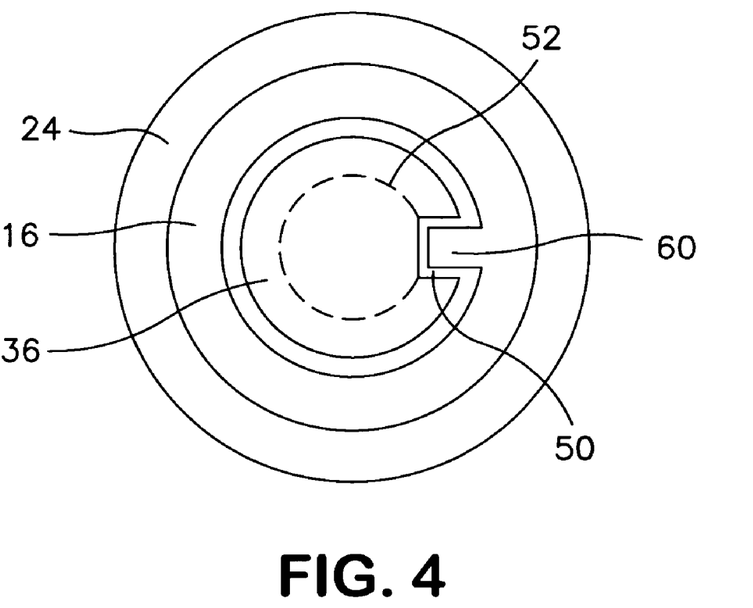
FIG. 4 is a top sectional view where the valve is locked open.
Figure 5:
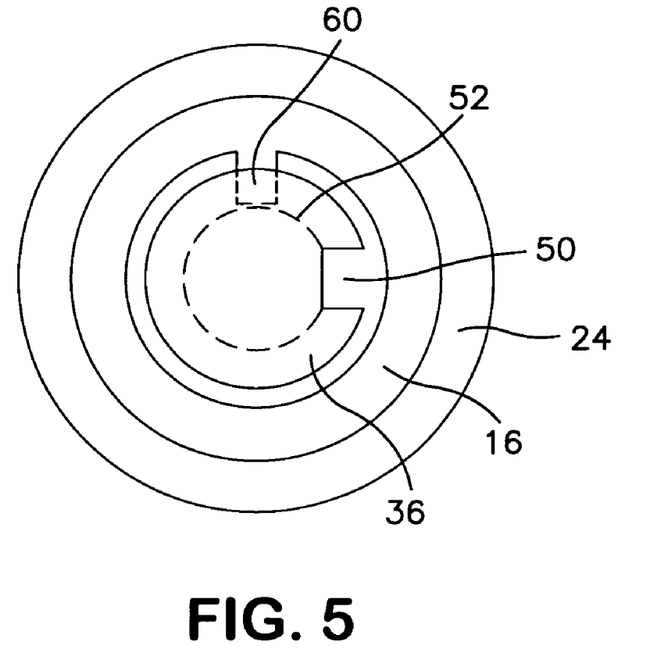
FIG. 5 is a top sectionalized view where the valve is locked closed.

FIGS. 4 and 5 illustrate the positions of the spur in grooves 52 (FIG. 4) and 50 (FIG. 5).

There has been described a valve especially useful for retaining and releasing air in a dunnage bag The bag is filled with air by simply forcing the open end of the nozzle of an air hose against the release disk. This action forces the seal plate 40 away from shoulder 38 so that air can enter into the bag through openings 18 in the release disk 16 and apertures 44 in shoulder 38.

Air is released from the bag through the same route by pressing release plate 16

The feature of locking the release plate in the air release position is an important convenience because the operator can quickly open the valve, rotate release disk and then go to the next bag while air is escaping.

The principle of the invention is a valve that is moved from a sealed position to a fill or release position by simply pressing a release plate and retaining the valve without continued effort by an operator by simply rotating the release plate.

Variations and modifications of the invention featuring adaptations of this principle may be contemplated after reading the specification and studying the drawings that are within the scope of the invention.

Figure 9:
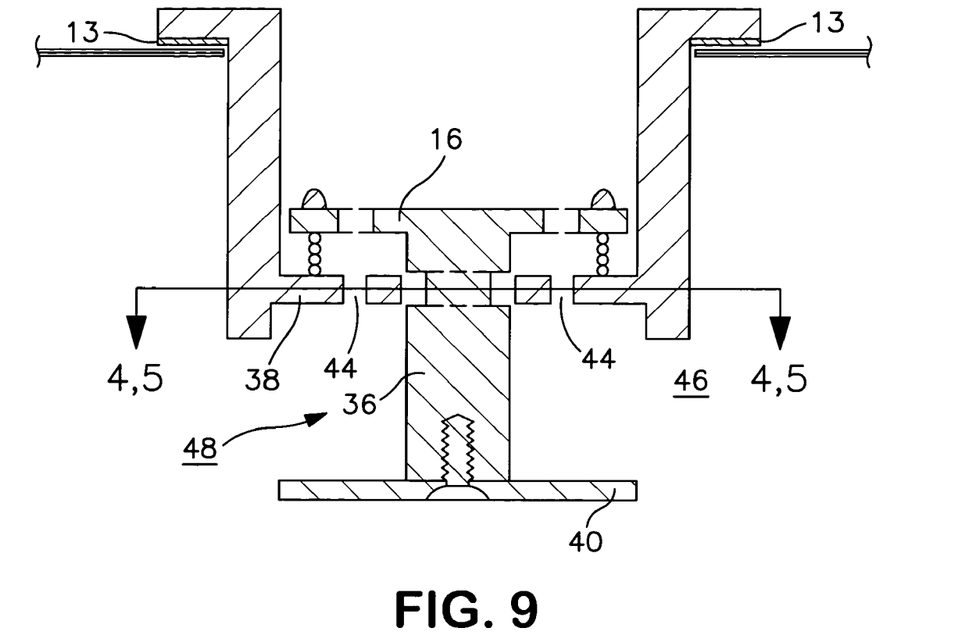
FIG. 9 shows an outer flange secured to said container by an adhesive.

For example, FIG. 9 shows a valve identical to FIG. 3 except that there is no inner flange 30 (as in FIG. 2). The outer flange 24 is sealed onto the bag 12 by adhesive 13.

Figure 10:
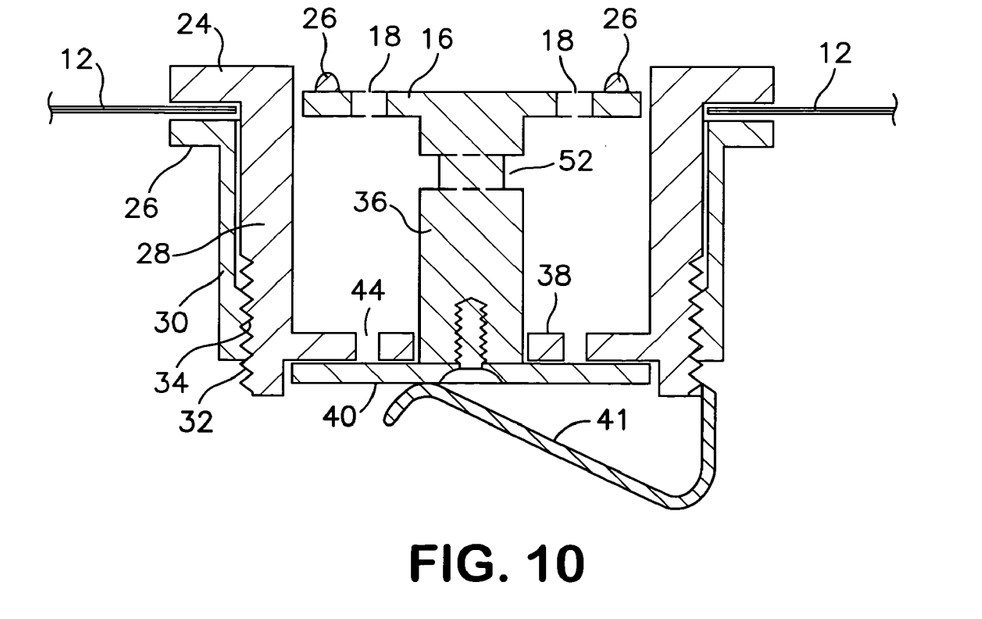
FIG. 10 shows the release plate biased by a leaf spring.

FIG. 10 shows a valve identical to FIG. 2 except there is no coil spring. A leaf spring 41 is shown having one end mounted on the shoulder 38 and another end pressing against the seal plate 40.

Figure 11:
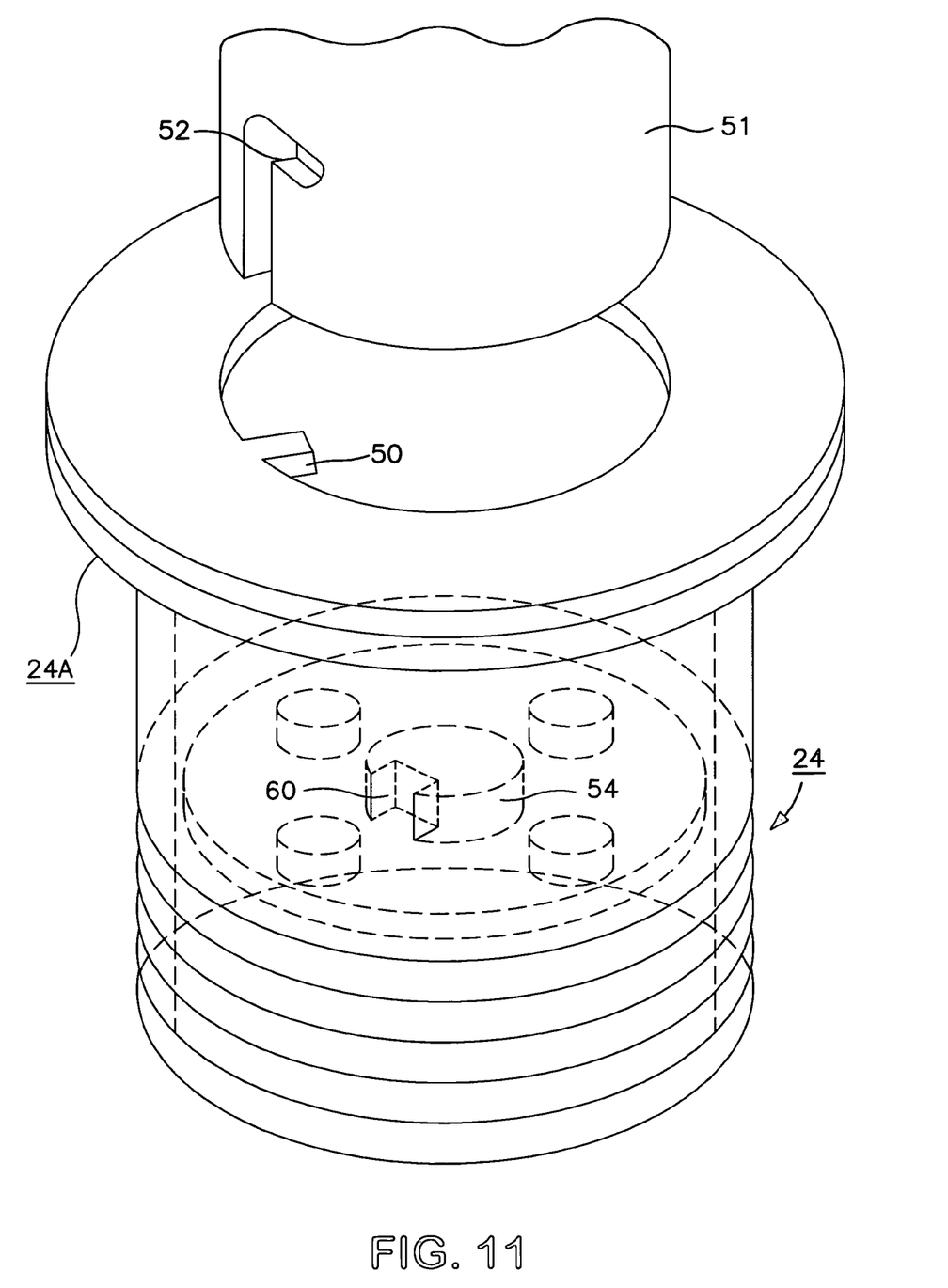
FIG. 11 shows a collar and nozzle.

FIGS. 11 show the collar 24 identical to FIG. 9 except that a "catch" 50 extends from an inside edge of flange 24.

There is also shown a nozzle 51 (cuttaway) for forcing air through the valve 10. The nozzle has a notch 52.

When it is required to force air into the bag, the open end of the nozzle 51 is forced into the collar 24 of valve 10 thereby depressing release disk 16. The nozzle 51 is retained in the valve when the nozzle 51 is rotated so that catch 50 engages notch 52. Filling the bag with air continues unattended since the nozzle is secured in place. The operator is free to perform other jobs such as filling other bags. This feature obviously reduces the time/labor of the truck operator/warehouse man.

A variation of the catch-notch feature of FIG. 11C is the catch formed in the nozzle and the notch formed in the flange member 24 of the valve 10.

In another version of the catch-notch in the flange-nozzle, a "coupling sleeve" comprising a short cylinder whose one end telescopes onto an existing nozzle and whose other end has a notch.52 adapted for engaging the catch in the valve. The "attachable notch" enables the user to adapt a "preowned" nozzle to engage the valve 10 of this invention.

In view of these and any other versions that are within the scope of this invention, It is therefore wished to define the scope of the invention by the appended claims.

What is claimed is:

1. A valve for controlling gas flow from a source of gas, through a nozzle and opening in a container into an interior of said container, said nozzle having a nozzle diameter, providing that a user is enabled to pass gas into said container by inserting an end of said nozzle into said valve and release gas from said container by manually applying force to said valve, said valve comprising:

an outer collar (28) having an entry end and an exit end;

an outer flange (24) having a flange opening and mounted securely concentrically flush on said entry end of said outer collar (28);

means for securing an outside surface of a wall of said container (12) flush against said outer flange (24) when said outside collar (28) is inserted through said container (12) opening into said interior region of said container with said entry end of said outer collar (28) on an outside of said container and an exit end of said collar inside of said container;

said outer collar (28) and outer flange (24) having an interior diameter and said nozzle having an outside diameter dimensioned to permit that said nozzle slides snugly through said flange opening and into said entry end of said outer collar (28);

said outer collar (28) having a circumferential shoulder (38) mounted on an interior surface of said outer collar (28) at an exit end of said outer collar;

said circumferential shoulder (38) having a plurality of flow openings (44);

a release disk (16) having a diameter selected to permit said release disk (16) to fit slideably inside said outer collar (28) adjacent said entry end of said outer collar (28);

said release disk (16) having a plurality of escape openings (18);

a seal plate (40) dimensioned to abut said exit end of said outer collar (28);

a stem (36) having one end securely abutting said release disk (16) and another end securely abutting said seal plate (40) and slideably passing through a guide hole in said shoulder (38) between said seal plate a(40) and said release disk (16);

said seal plate (40) slideably positionable in one location against said exit end of said outer collar (28) wherein air is prevented from flowing through said outer collar (28) and out of said container (12); and said seal plate (40) slideably positionable in another location separated from said exit end of said outer collar (28) providing that air is able to flow through said outer collar (28) out of said container (40);

a spring means for biasing said seal plate toward said one location, said spring means having one end abutting said shoulder (38) and another end abutting said release plate 16 providing that a user is enabled to pass gas from a source of gas into said container by inserting an end of said nozzle from said source through said outer collar of said valve and release gas from said container by manually applying force to said release disk of said valve wherein said means for securing said outside surface of said wall of said container (12) flush against said outer flange (24) comprises: an inner flange (26) having a central opening; an inner collar (30) having an interior thread; said inner flange (26) securely mounted concentrically flush on an end of said inner collar (30); said inner collar (30) having an external thread dimensioned to permit screwing said inner collar onto said outer collar with said wall secured between said inner and outer flanges when said inner and outer collars are positioned through said container opening.

2. The valve of claim 1 wherein said means for securing said outside surface of said wall of said container (12) flush against said outer flange comprises an adhesive layer between said outside surface of said wall (12) and said outer flange (24).

3. The valve of claim 1 wherein said spring means comprises a coil spring (42).

4. The valve of claim 1 wherein said spring means comprises a leaf spring (41).

5. The valve of claim 1 comprising:

said stem (36) having a cylindrical surface with a longitudinal groove (50) connected at one end to a circumferential groove (52);

said circumferential groove proximal to said release disk (22);

a spur (60) on an inside edge of said guide hole of said shoulder (38) engaging any one of said longitudinal groove and said circumferential groove providing that, when said spur engages said longitudinal groove, said seal plate is slideable toward and away from said end of said outer collar (28) providing control of air through said outer collar (28) and when said spur (60) engages said circumferential slot (52), said seal plate (40) is retained separated from said shoulder (38) permitting air flow through said outer collar (28).

6. The valve of claim 1 comprising:

a catch attached to an interior surface of said collar proximal to said entry end and extending toward an interior of said collar;

a nozzle having one nozzle end attachable to a source of pressurized air and another nozzle end dimensioned to telescope into said entry end of said collar;

a notch means formed in said another nozzle end of said nozzle for engaging said catch with said notch when said another nozzle end is inserted into said entry end of said collar and turned.

7. The valve of claim 1 comprising:

a catch attached to an interior surface of said collar proximal to said entry end and extending toward an interior of said collar;

a coupling sleeve having one sleeve end telescopable onto a nozzle leading to a source of pressurized air and another sleeve end dimensioned to telescope into said entry end of said collar;

a notch means formed in said coupling sleeve for engaging said catch with said notch when said another sleeve end is inserted into said entry end of said collar and turned.

8. A valve for controlling gas flow from a source of gas, through a nozzle into a container, said container having a container opening and an interior region of said valve, said nozzle having a nozzle diameter, said valve comprising:

an outer collar (28) having an entry end and an exit end;

an outer flange (24) having a flange opening and mounted concentrically flush on said entry end of said outer collar (28);

means for securing an outside surface of a wall of said container (12) flush against said flange when said outside collar (28) is inserted through said container (12) opening into said interior region of said container with said entry end of said collar on an outside of said container and an exit end of said collar inside of said container;

said means for securing being one of:
  (i) an adhesive layer between said outside surface of said wall and said outer flange;
  (ii) an inner flange (26) having a central opening;
    an inner collar 30 having an interior thread;
      said inner flange securely mounted concentrically on an end of said inner collar;
      said inner collar having an external thread dimensioned to permit screwing said inner collar onto said outer collar to where said wall is secured between said inner and outer flanges when said inner and outer flanges are positioned through said container opening;
said outer collar (28) and outer flange (24) having an interior diameter and said nozzle having an outside diameter to permit that said nozzle slides snugly through said flange opening and into said entry end of said outer collar;
said outer collar having a circumferential shoulder mounted on an interior surface of said outer collar (28) at an exit end of said outer collar;
said circumferential shoulder (38) having a plurality of flow openings (44);
a release disk (16) having a diameter selected to permit said release disk (16) to fit slideably inside said outer collar (28) adjacent said entry end of said outer collar (28);
said release disk (16) having a plurality of escape openings (18);
a seal plate (40) dimensioned to abut said exit end of said outer collar (28);
a stem (36) having one end securely abutting said release disk (40) and another end securely abutting said seal plate (40) and slideably passing through a guide hole in said shoulder (38) between said seal plate a(40) and said release disk (16);
said seal plate (40) slideably positionable in one location against said exit end of said outer collar (28) wherein air is prevented from flowing through said outer collar (28) and out of said container (12); and
said seal plate (40) slideably positionable in another location separated from said exit end of said outer collar (28) providing that air is able to flow through said outer collar (28) out of said container (40);
a spring means for biasing said seal plate toward said one location having one end abutting said shoulder (38) and another end abutting said release plate 16;
said spring means being one of a leaf spring and a coil spring;
  said stem having a cylindrical surface with a longitudinal groove connected at one end to a circumferential groove;
  a spur (60) on an inside edge of said guide hole engaging any one of said longitudinal groove and said circumferential groove providing that, when said spur engages said longitudinal groove, said seal plate is slideable toward and away from said end of said outer collar (28) providing control of air through said outer collar (28) and when said spur (60) engages said circumferential slot (52), said seal plate (40) is retained separated from said shoulder (38) permitting air flow through said outer collar (28).

\* \* \* \* \*